June 14, 1932. McCONNELL SHANK 1,863,209
METHOD OF MAKING MOLDED ARTICLES
Filed June 20, 1929

Inventor
McConnell Shank
By Eakin & Avery
Attys.

Patented June 14, 1932

1,863,209

UNITED STATES PATENT OFFICE

McCONNELL SHANK, OF AKRON, OHIO, ASSIGNOR TO THE B. F. GOODRICH COMPANY, OF NEW YORK, N. Y., A CORPORATION OF NEW YORK

METHOD OF MAKING MOLDED ARTICLES

Application filed June 20, 1929. Serial No. 372,244.

This invention relates to molded articles having metal inserts molded therein and to methods of producing such articles, and is here illustrated and described as applied to the manufacture of hard rubber battery jar covers in which are incorporated tubular metal bushings to serve as linings for the terminal-post apertures.

In the manufacture of such articles heretofore it has been difficult to prevent the moldable composition from flowing onto the inner surface of the tubular metal bushing because of mis-aligned or worn positioning studs upon which the bushings have been supported during the molding operation. Such composition on the inner surface of the bushings requires subsequently to be removed by a relatively costly reaming operation which frequently results in breakage of the article.

The chief objects of this invention are to prevent flow of the composition onto the inner surface of a metal bushing in the molding of a battery jar cover or the like thereon, and to provide an improved metal bushing for such use.

Figure 3:
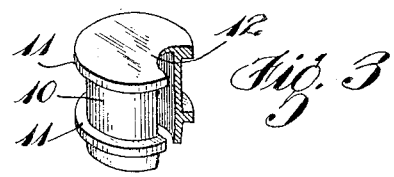
Fig. 3 is a perspective view of my improved bushing, a part being broken away and a part being in section.

Referring to Fig. 3 of the drawing, the metal insert comprises a generally tubular structure 10 exteriorly formed with the usual radial flanges 11, 11, and having one of its ends closed, as shown, by an integral, relatively thin wall or web 12, although it is not entirely essential that the web be imperforate in its central region.

Figure 2:
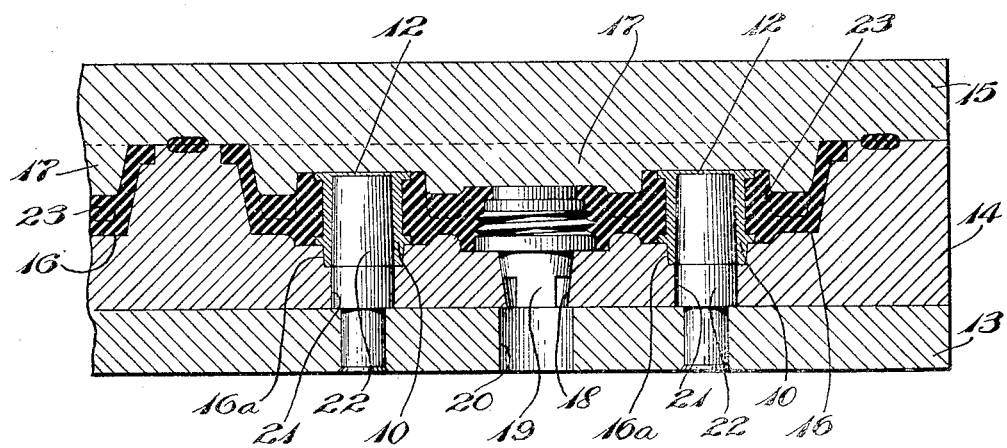
Fig. 2 is a fragmentary vertical section through a vulcanizing mold adapted for the practice of my improved method, and the work therein.

The mold shown in Fig. 2 comprises a base plate 13, an intermediate cavity plate 14 and a top or cover plate 15. The intermediate plate 14 is formed with cavities 16, 16 and the cover plate 15 is formed with elevations 17, 17 and mates with the cavity plate to define molding spaces for a plurality of battery covers. Each molding cavity of the plate 14 is formed with a through aperture 18 to accommodate the shank portion of a threaded member 19, which is molded into the article and subsequently removed therefrom to provide the filling aperture, and the base plate 13 is formed with apertures such as the aperture 20, which register with the apertures 18 of the plate 14. Each molding cavity 16 of the plate 14 also is formed with two through apertures 21, 21 to accommodate respective insert-positioning studs 22, 22 which are mounted upon the base plate 13 and extend upwardly therefrom. Preferably the insert-engaging portions of the studs 22 are slightly tapered to facilitate withdrawal of the studs from the inserts.

In the manufacture of battery jar covers, the cover 15 of the mold being raised, the molding operation is prepared for by mounting the threaded members 19 in the apertures 18 and mounting the metal inserts 10 upon respective studs 22, each insert being manually pressed thereupon so that its lower end sets firmly in a socket 16ª comprising a portion of the mold cavity 16. Plastic unvulcanized rubber composition is then placed in each cavity 16, the cover 15 closed upon the plate 14, and the mold mounted in a vulcanizing press where the articles are vulcanized under heat and pressure in the usual manner. The close fit of the inserts 10 in the sockets 16ª effectively prevents the rubber from reaching the open ends of the inserts and the webs 12 prevent entry of the stock at the other ends of the inserts.

Figure 1:
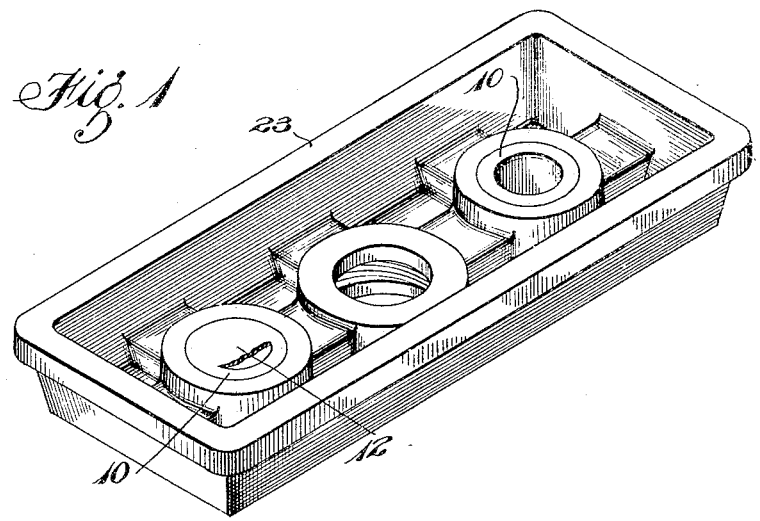
Fig. 1 is a perspective view of a battery jar cover embodying and made in accordance with my invention.

After vulcanization the battery jar covers are removed from the mold and the members 19 unthreaded therefrom, the covers then presenting the appearance of the cover 23 as shown in Fig. 1, the webs 12 still being in place over the ends of the inserts 10. Subsequently the webs are removed by punching or reaming so that the inserts have the appearance of the insert shown at the right in Fig. 1.

My invention reduces the cost of manufacture and obviates the breakage incidental to the prior practice which required the removal of vulcanized rubber from inside the metal bushings.

Modifications may be resorted to within the scope of the appended claims, and I do not limit my claims wholly to the specific construction of the insert shown, or to the exact procedure described.

I claim:

1. The method of making an article of molded material having therein a hollow insert, which comprises forming the insert with an integral protective portion adapted to exclude from the interior thereof moldable material molded about its exterior, molding the material about the insert, and then removing the said protective portion of the insert.

2. The method of making an article of molded material having therein a tubular insert, which comprises forming the insert with an integral end closing web adapted to exclude from the interior thereof moldable material molded about its exterior, molding the material about the insert and then removing the said web from the insert.

3. The method of making an article of molded material having therein a hollow insert open to the exterior of the article, which comprises forming the insert with an integral protective portion adapted to exclude from the interior thereof moldable material molded about its exterior, molding the material about the insert, and then opening the interior of the insert to the exterior of the article by removing the said protective portion of the insert.

4. The method of making an article of molded material having therein a hollow insert which comprises forming the insert with an integral protective portion adapted to exclude from the interior thereof moldable material molded about its exterior, holding the insert in a determinate relative position while molding the material to determinate shape about the insert, and then removing the said protective portion of the insert.

In witness whereof I have hereunto set my hand this 17th day of June, 1929.

McCONNELL SHANK.